United States Patent
Wilkinson et al.

(10) Patent No.: US 11,835,167 B2
(45) Date of Patent: *Dec. 5, 2023

(54) POLYMER-LINED FLUID TRANSMISSION LINE

(71) Applicant: REINKE MANUFACTURING CO., INC., Deshler, NE (US)

(72) Inventors: Douglas Lynn Wilkinson, Belleville, KS (US); Jon Patrick Henry, Deshler, NE (US); Russell Scott Reinke, Davenport, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,516

(22) Filed: Mar. 15, 2022

(65) Prior Publication Data

US 2022/0205564 A1 Jun. 30, 2022

Related U.S. Application Data

(62) Division of application No. 16/526,515, filed on Jul. 30, 2019, now Pat. No. 11,448,354.

(51) Int. Cl.
*F16L 23/16* (2006.01)
*F16L 58/18* (2006.01)
(Continued)

(52) U.S. Cl.
CPC ............ *F16L 58/187* (2013.01); *F16L 23/16* (2013.01); *F16L 3/2336* (2013.01); *F16L 17/04* (2013.01); *F16L 19/12* (2013.01)

(58) Field of Classification Search
CPC ......... F16L 17/04; F16L 3/2336; F16L 19/12; F16L 58/1018; F16L 58/18; F16L 58/184; F16L 58/185; F16L 58/187
See application file for complete search history.

(56) References Cited

U.S. PATENT DOCUMENTS 2,973,975 A * 3/1961 Ramberg .............. F16L 33/224
285/259
3,151,869 A 10/1964 Butcher
(Continued)

FOREIGN PATENT DOCUMENTS

DE 1 162 651 B 2/1964
GB 904975 A 9/1962
GB 2047834 A 12/1989

OTHER PUBLICATIONS

Notice of Allowance dated May 12, 2022 in U.S. Appl. No. 16/526,515, 10 pages.
(Continued)

*Primary Examiner* — Zachary T Dragicevich
*Assistant Examiner* — James A Linford
(74) *Attorney, Agent, or Firm* — SHOOK, HARDY & BACON L.L.P.

(57) ABSTRACT

A polymer-lined fluid transmission line includes various structures, including a first polymer-lined pipe, a second polymer-lined pipe, and one or more sleeve retainers installed at a pipe junction between the polymer-lined pipes. Among other things, the sleeve retainers may include one or more protuberances to frictionally engage the polymer-lined pipes or a one or more portions that protrude into a space between the polymer-lined pipes to help retain and protect polymer sleeves.

18 Claims, 11 Drawing Sheets

(51) Int. Cl.
    *F16L 17/04*         (2006.01)
    *F16L 3/233*         (2006.01)
    *F16L 19/12*         (2006.01)

(56) References Cited

U.S. PATENT DOCUMENTS

| | | |
|---|---|---|
| 3,228,096 A | 1/1966 | Albro |
| 3,253,841 A | 5/1966 | Ahmad |
| 3,877,730 A | 4/1975 | Frantz |
| 3,968,552 A | 7/1976 | Hunter |
| 7,107,662 B1 | 9/2006 | Evario |
| 7,407,165 B1 | 8/2008 | Chisnell |
| 2003/0047939 A1* | 3/2003 | Whitehead ............ F16L 55/165 285/55 |
| 2004/0164554 A1 | 8/2004 | Cabezas |
| 2005/0257848 A1 | 11/2005 | Funatsu et al. |

OTHER PUBLICATIONS

Non-Final Office Action dated Mar. 31, 2023 in U.S. Appl. No. 17/947,867, 18 pages.

* cited by examiner

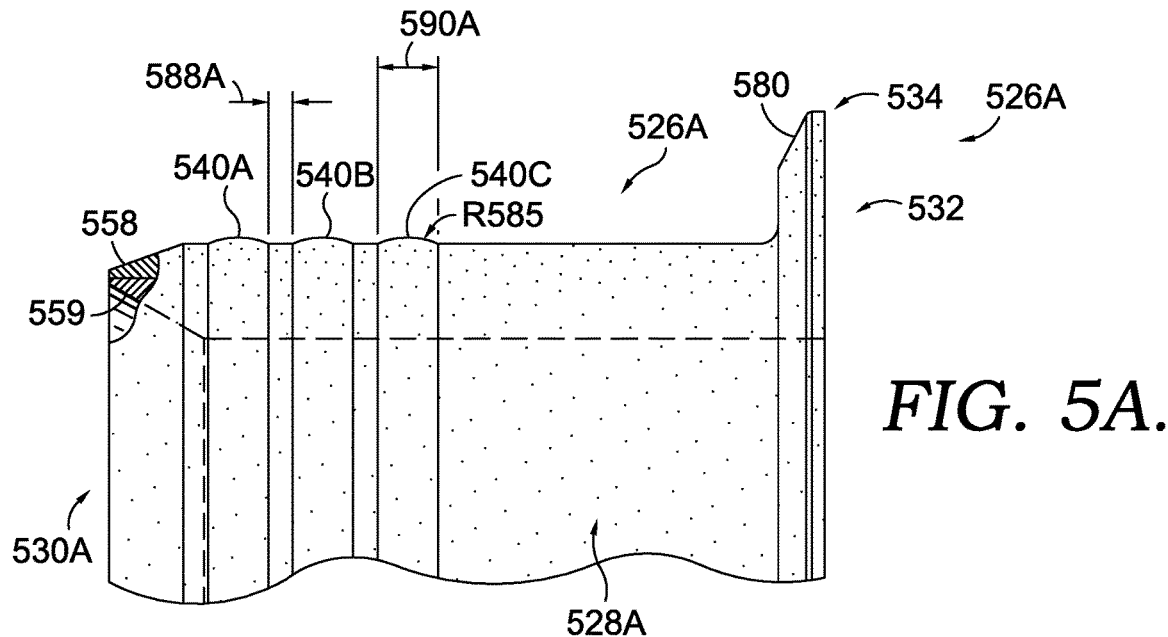
FIG. 5A.
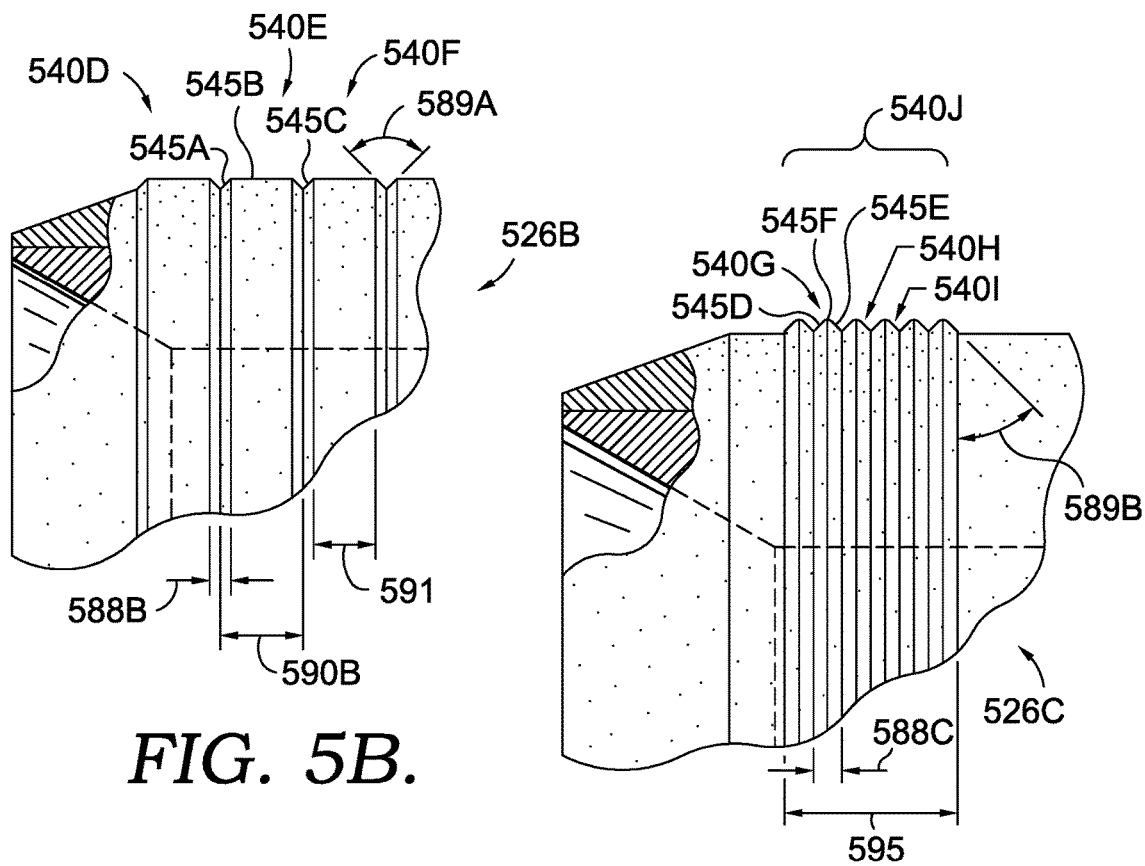
FIG. 5B.
FIG. 5C.

POLYMER-LINED FLUID TRANSMISSION LINE

CROSS-REFERENCE TO RELATED APPLICATIONS

This application is a divisional of U.S. application Ser. No. 16/526,515, entitled, "POLYMER-LINED FLUID TRANSMISSION LINE", filed Jul. 30, 2019. The entirety of the aforementioned application is incorporated herein by reference.

TECHNICAL FIELD

This disclosure relates to irrigation systems, including connections for polymer-lined pipes.

BACKGROUND

Mechanized irrigation systems provide the ability to manage water resources and, in some instances, other liquids. For example, mechanized irrigation systems can enable application of water and other liquids at various times during a crop's life cycle to fortify crop health and improve yield potential. While there are many components that make up mechanized irrigation systems, in a general sense, such systems include a mechanical structure, a drivetrain, and a control system. One common type of mechanized irrigation systems is a center-pivot arrangement that includes a center point about which the system rotates or swivels. Another common type of mechanized irrigation system includes a lateral-move system, in which opposing ends of the system may each move independently of one another, such as with independent drivetrains.

Both the center-pivot and the lateral-move systems include a "span," which as the term is used herein, is a structural assembly comprised of a horizontal irrigation pipeline, struts and braces, and a truss-rod connection system. The horizontal irrigation pipeline generally is comprised of a plurality of pipes or pipe sections coupled with one another to form an elongated pipeline structure. Each pipe or pipe section constructing the horizontal irrigation pipeline may be formed from a variety of materials such as, by way of example only, galvanized steel, aluminum, or stainless steel. Such material variety provides the ability for users to choose the proper pipeline material based upon the liquid or liquids being discharged through the irrigation system.

In some applications, it is desirable to discharge liquids other than, or in addition to, water through the irrigation system. Such liquids may include, by way of example only, chemical fertilizers (acidic and/or basic), chemicals for water treatment, and the like. In some cases, liquids that may be highly corrosive to the material comprising the irrigation pipeline are dispersed onto the field. To prevent the irrigation pipeline from coming into contact with a corrosive liquid, a polymer liner may be disposed on or adjacent the interior surface of the pipeline to separate the liquid from the pipeline material. Exemplary materials from which such polymer liners may be formed include, without limitation, polyethylene and polypropylene.

Irrigation systems comprising a polymer-lined pipeline present a unique set of challenges. For example, there is typically a need to retain the polymer lining in place within the pipe or pipe sections until its final installation on the system. Generally speaking, the polymer is highly susceptible to expansion and contraction under varying temperatures and humidity due to its chemical properties. As such, retaining the polymer lining within the pipe can be challenging, especially since it is common to transport polymer-lined pipes on flatbed trailers or other non-climate controlled shipping vehicles. Furthermore, because two polymer liners typically mate together to form a seal (i.e., when the pipes are connected end-to-end), it is important to maintain a smooth terminal-end surface for achieving a tight, leak-resistant seal. Transporting the polymer-lined pipes might expose the terminal-end surfaces to potential damage, which can reduce the sealing ability of the terminal-end surface, such as from debris or if the sleeve is not retained within the pipe.

SUMMARY

At a high level, some aspects of this disclosure are directed to a sleeve retainer that is insertable into a pipe lined with a polymer sleeve. Among other things, the sleeve retainer may retain the polymer sleeve within the pipe, protect the polymer sleeve, and provide a seal with another polymer-lined pipe. This summary is provided to introduce a selection of concepts in a simplified form that are further described below in the detailed description. This summary is not intended to identify key features or essential features of the claimed subject matter, nor is it intended to be used in isolation in determining the scope of the claimed subject matter.

BRIEF DESCRIPTION OF THE SEVERAL VIEWS OF THE DRAWINGS

Some aspects of this disclosure are described in detail below with reference to the figures that are submitted together with this detailed description. The figures are incorporated herein by reference in their entirety, and a brief description of each figure is provided directly below.

Each of FIGS. 5A-5C depicts a portion of a respective sleeve retainer in accordance with an aspect of this disclosure.

Figure 6A:
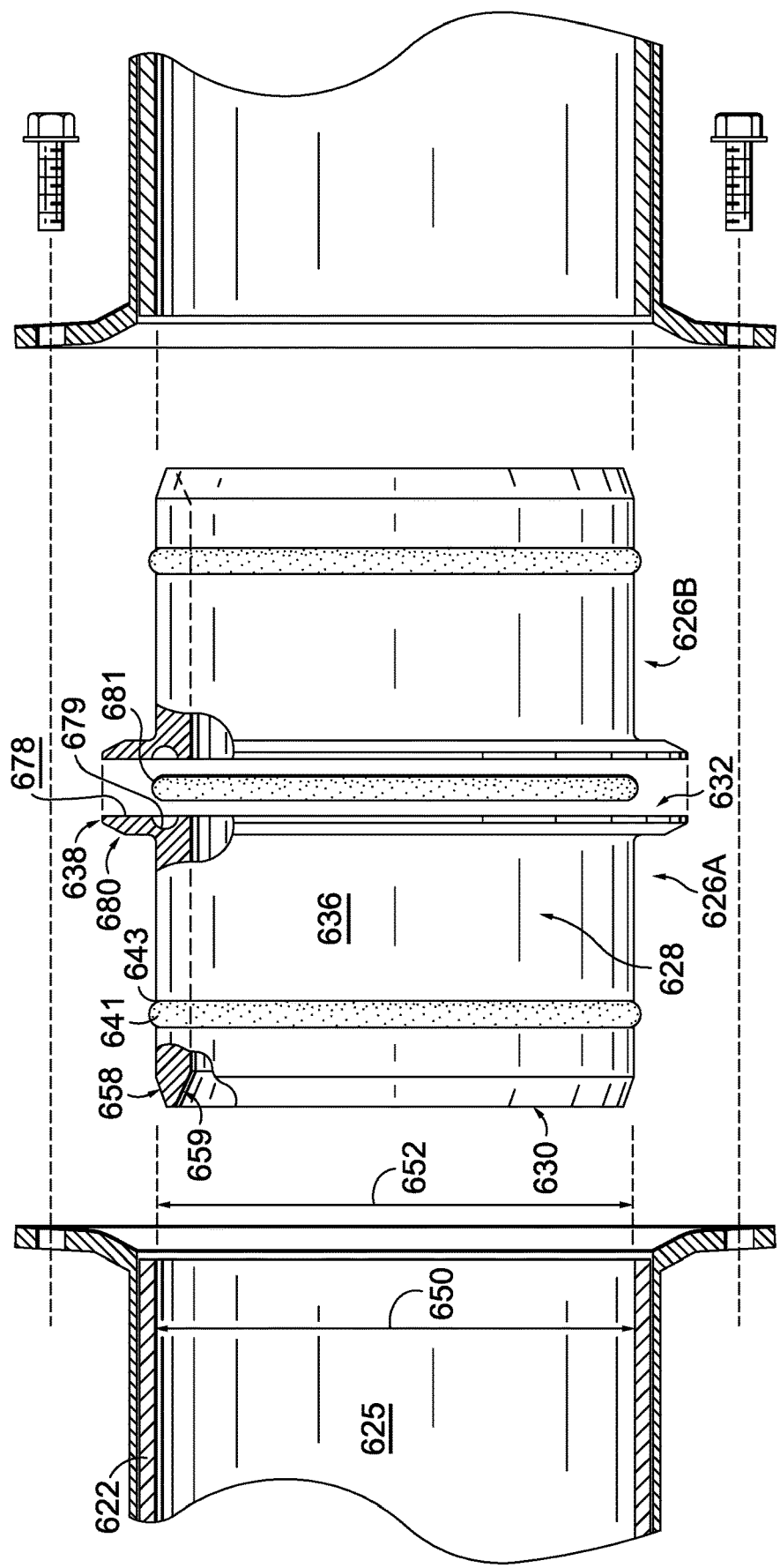

FIG. 6A depicts an exploded view of a pipe junction with an O-ring-style sleeve retainer in accordance with an aspect of this disclosure.

Figure 6B:
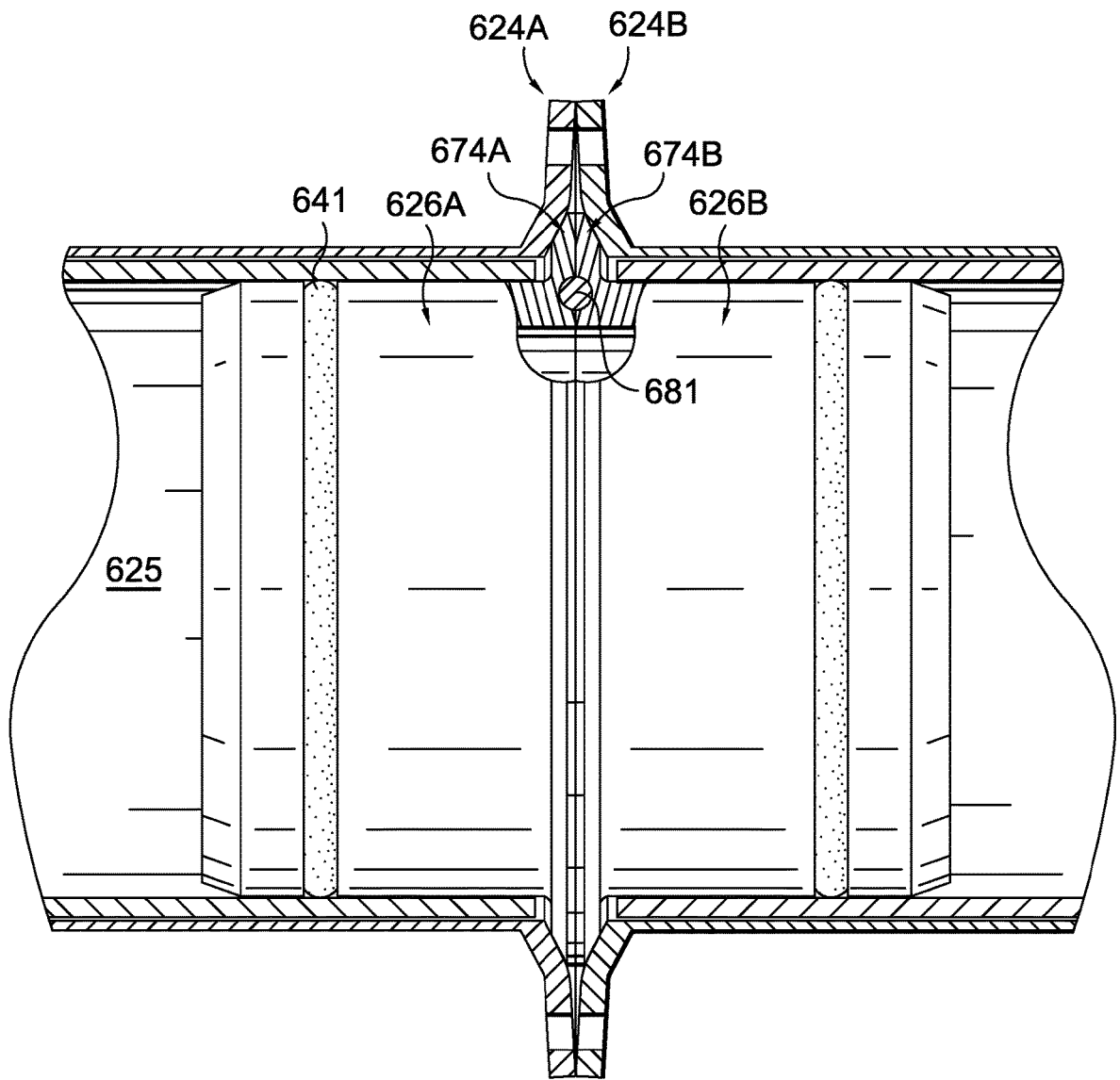

FIG. 6B depicts an assembled view of the pipe junction in FIG. 6A in accordance with an aspect of this disclosure.

Figure 7:
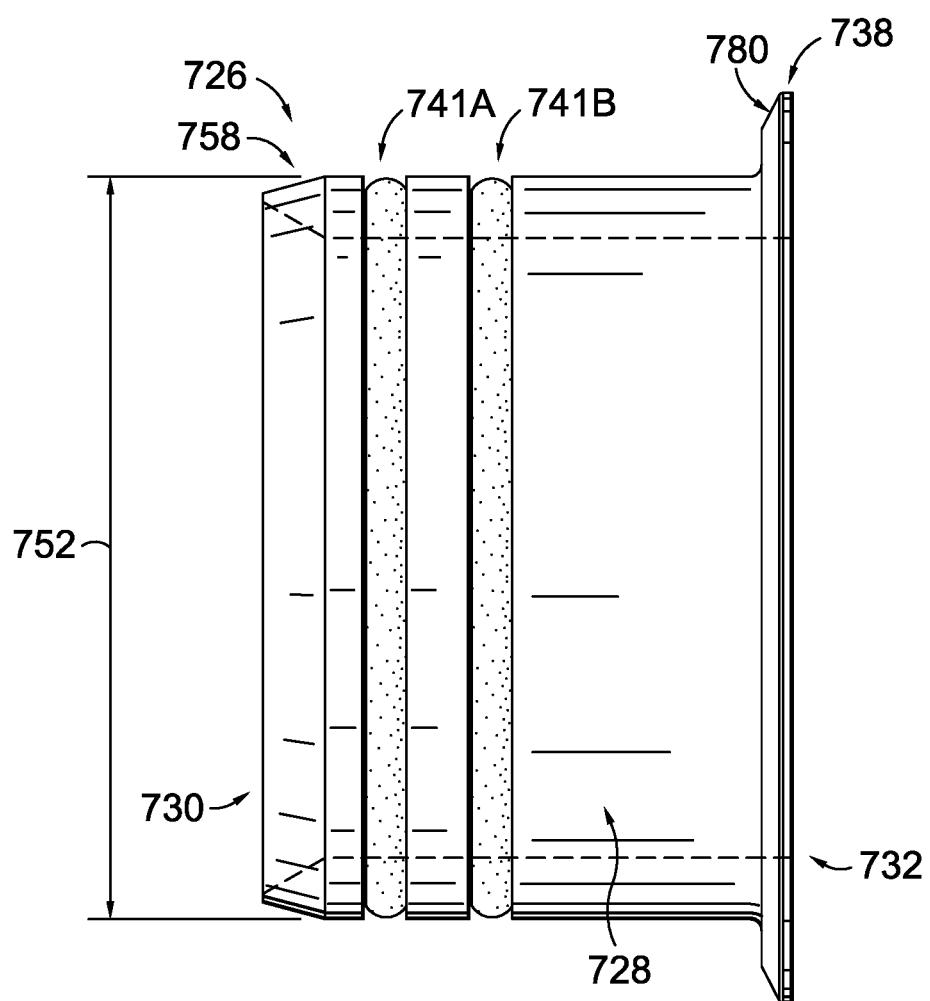

FIG. 7 depicts an alternative O-ring-style sleeve retainer in accordance with an aspect of this disclosure.

Figure 8A:
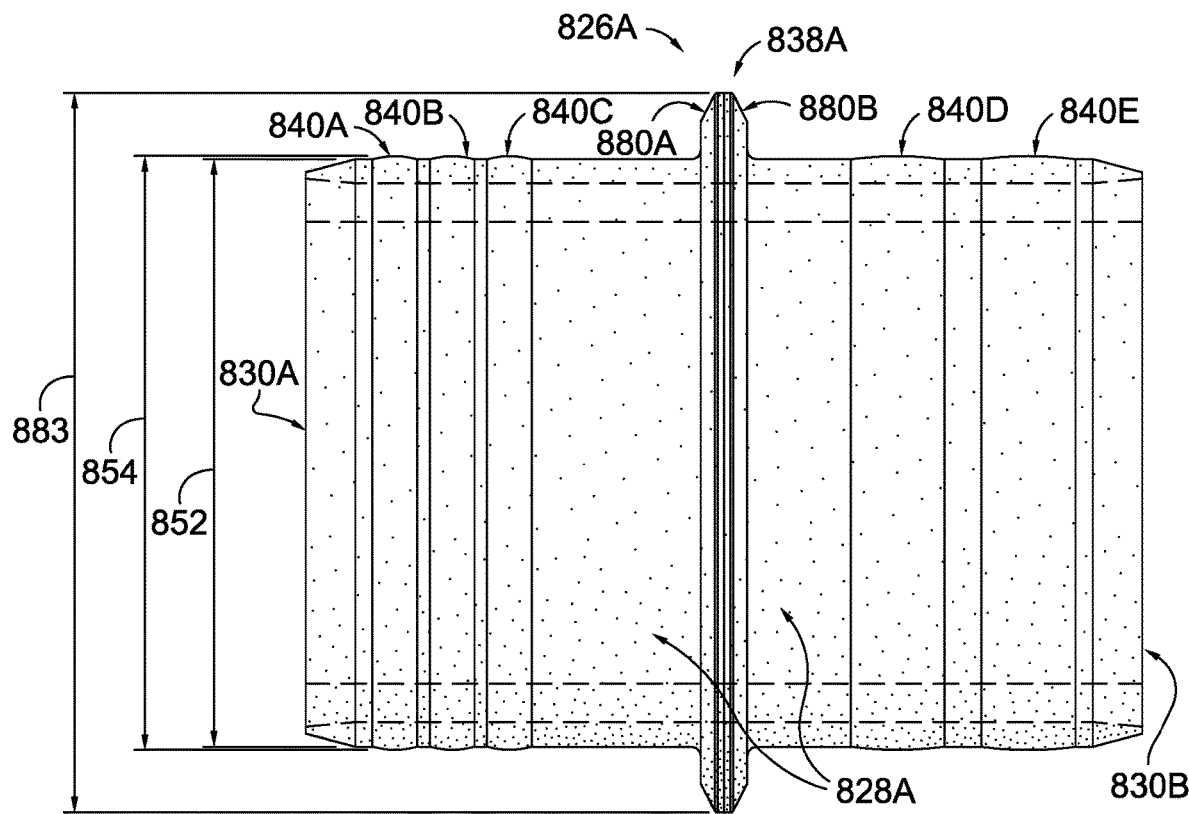
Figure 8B:
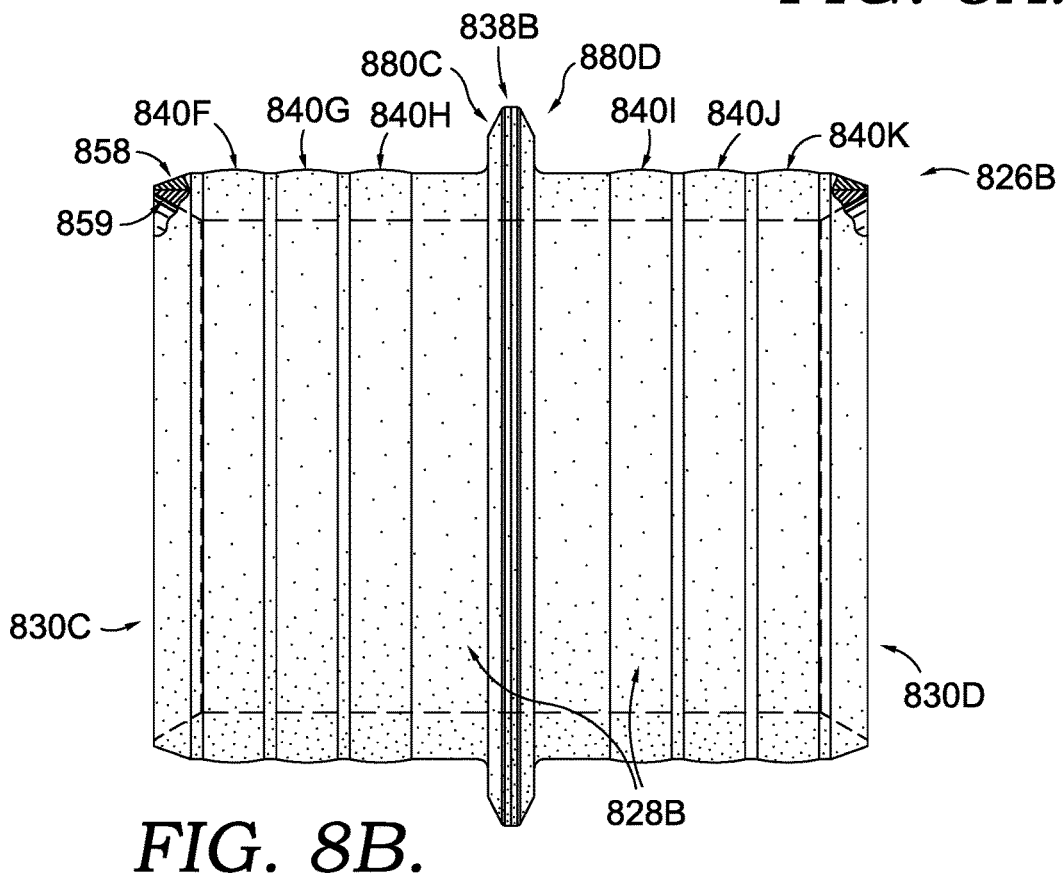

Each of FIGS. 8A and 8B depicts a respective dual-end, barb-style sleeve retainer in accordance with an aspect of this disclosure.

Figure 9A:
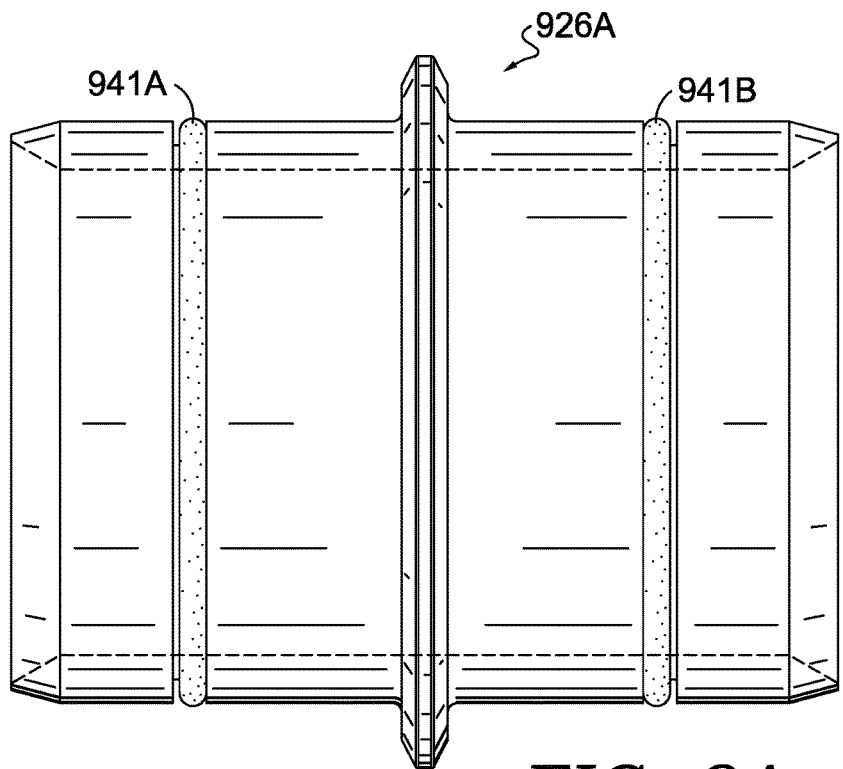
Figure 9B:
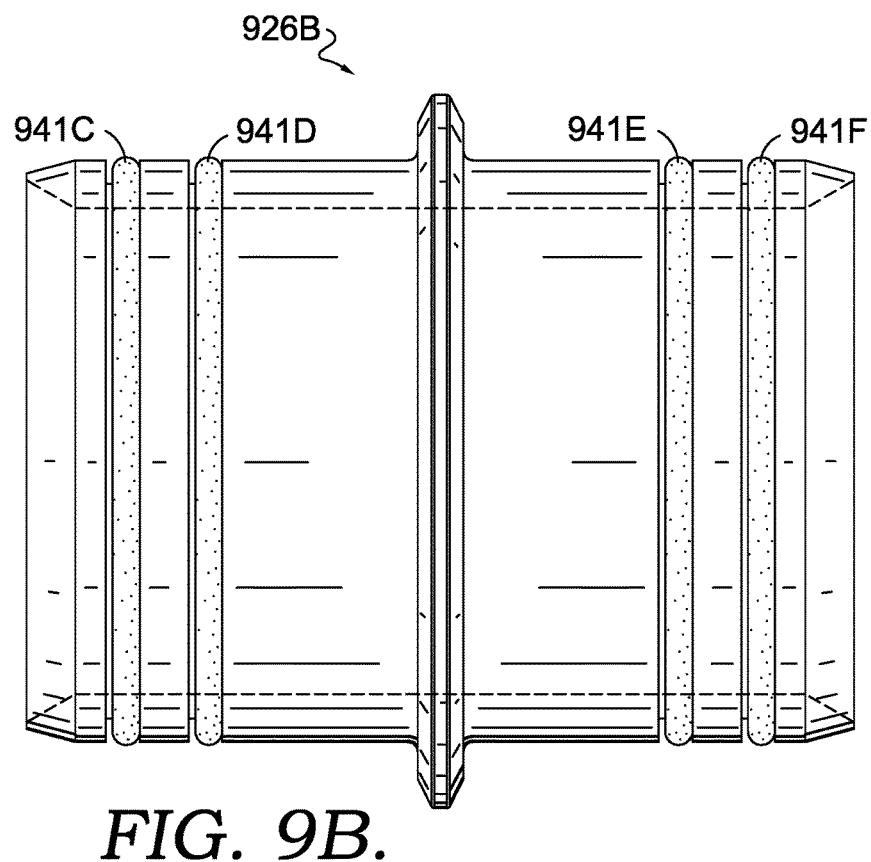

Each of FIGS. 9A and 9B depicts a respective dual-end, O-ring-style sleeve retainer in accordance with an aspect of this disclosure.

DETAILED DESCRIPTION

Subject matter is described throughout this disclosure in detail and with specificity in order to meet statutory requirements. The aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar or equivalent to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

At a high level, aspects herein are directed to a sleeve retainer for a pipe lined with a polymer sleeve. Among other things, the sleeve retainer may be inserted into an end of the polymer-lined pipe and is operable to retain the polymer sleeve in position, to protect the polymer sleeve, and to form a seal with another pipe connected end-to-end. Furthermore, some aspects are directed to a fluid-transmission line, which includes a first polymer-lined pipe and a second polymer-lined pipe connectable end-to-end at a pipe junction, and one or more sleeve retainers installed at the pipe junction.

Figure 1:
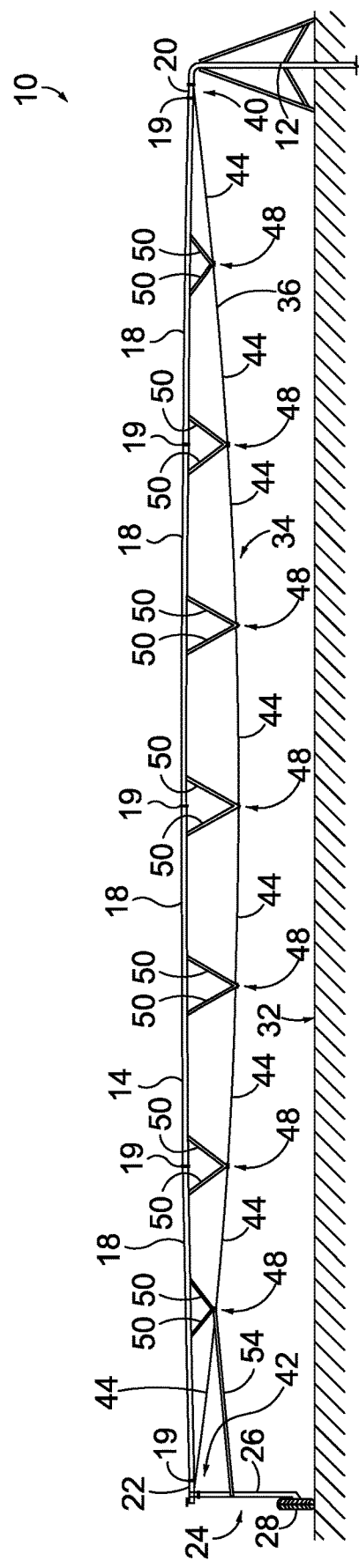
FIG. 1 depicts a front elevation view of an irrigation system in accordance with an aspect of this disclosure.

Having described some aspects of this disclosure at a high level, reference is now made to FIG. 1 illustrating an example of an irrigation system 10. The illustrated irrigation system 10 is a section of a center-pivot type irrigation system that revolves or rotates around a fluid source 12, and in other aspects, irrigation system may be a linear or lateral-move irrigation system, or any other type of irrigation system. As such, in accordance with aspects of this disclosure, a sleeve retainer, as well as a fluid-transmission line including a sleeve retainer, may be included in an irrigation system that is similar to the irrigation system 10 of FIG. 1 or that varies from the irrigation system depicted in FIG. 1.

The illustrated irrigation system 10 includes a pipeline 14 coupled to the fluid source 12. The pipeline 14 extends from the fluid source 12 to a tower 24. The pipeline 14 may comprise a plurality of pipe segments 18 coupled to one another, or to other segments, at pipe junctions 19, which will be described in greater detail in other portions of this disclosure. In other aspects, the pipeline 14 may comprise a single pipe segment.

A first segment 20 of the pipeline 14 may connect to the fluid source 12 with a span coupling. The first segment 20 may include the span coupling, or a portion of the span coupling (e.g., a hook), for detachably coupling to the fluid source 12. The span coupling may comprise a hook-and-receiver-type span coupling. For example, the first segment 20 may include a hook that may be detachably coupled to a receiver (e.g., a ring) connected to the fluid source 12. Such a span coupling may provide a highly efficient point of rotation for the pipeline 14 when placed in the center of the pipeline 14.

In the illustrated aspect, the pipeline 14 is capped at a last segment 22. It may be advantageous in some aspects, however, to provide a multi-span irrigation system to permit irrigation of a greater area. For example, the irrigation system 10 may comprise a first span and a second irrigation system may comprise a second span, an ancillary span, or a swing arm that may be attached to the first span. Thus, the multi-span irrigation system may be composed of two or more irrigation systems (e.g., the irrigation system 10). In this example, the second span, ancillary span, or swing arm may be coupled to the last segment 22 of the pipeline 14 of the irrigation system 10 to increase the area over which the combined irrigation system travels. Thus, the last segment 22 of the pipeline 14 may include a span coupling (e.g., a hook and a receiver), or a portion of a span coupling, (e.g., a receiver) for connecting to a span coupling (e.g., a hook) of the second span, ancillary span, or swing arm. Hook-and-receiver-type span couplings are preferred, but other types of span couplings may also be useful with the present invention.

The tower 24 supports the last segment 22 of the pipeline 14. In other aspects, the tower 24 may support an intermediate portion of the pipeline 14 resulting in a portion of the pipeline 14 cantilevered past the tower 24. The tower 24 includes one or more support legs 26 and one or more wheels 28. In some aspects, the tower 24 is self-propelled and includes a drive unit that causes the wheels to rotate to carry the pipeline 14 over a field 32. In other aspects, other equipment (e.g., electronics) may be mounted on the tower 24.

A truss system 34 includes a first truss rail 36 and a second truss rail (obscured from view in FIG. 1 on the other side of the system 10). In some aspects, a truss system may include only one truss rail. In other aspects, the truss system may include more than two truss rails. The first truss rail 36 and the second truss rail are substantially similar and the following description of the first truss rail 36 applies equally to the second truss rail. A first end 40 of the first truss rail 36 is coupled to the first segment 20 of the pipeline 14. Likewise, a second end 42 of the first truss rail 36 is coupled to the last segment 22 of the pipeline 14. The first truss rail 36 includes a plurality of headed truss rods 44 coupled end-to-end between a pair of cooperating mating members at each of one or more intermediate joints 48.

The truss system 34 includes a plurality of pairs of struts 50 extending from the pipeline 14 with which they are coupled via conventional means (e.g., fastened to a plate that is welded to the pipeline 14). Each pair of struts 50 additionally is coupled to each other at one of the intermediate joints 48. The truss system 34 further includes a plurality of cross-members that are also obscured from view and that extend from one of the intermediate joints 48 of the first truss rail 36 to an intermediate joint of the second truss rail and spaces the intermediate joints, and thereby the first and second truss rails apart. In the illustrated embodiment, a brace 54 also extends from the tower 24 to one of the intermediate joints 48 to provide additional support and to stabilize the tower 24. In some aspects, one or more of the intermediate joints may comprise flying joints that do not have a strut 50, a cross-member 52, or a brace 54 attached. Thus, these flying joints include only adjacent truss rods 44 coupled end-to-end between the pair of cooperating members.

Figure 2A:
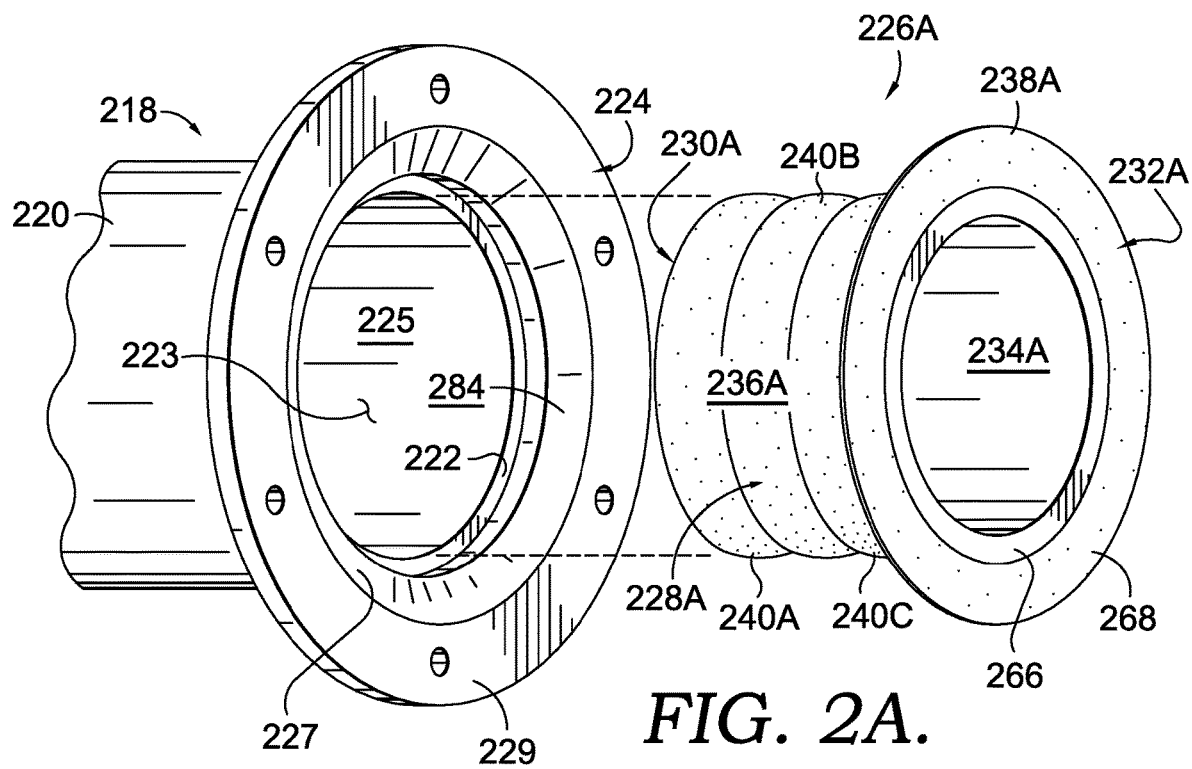
FIG. 2A depicts a polymer-lined pipe with and a sleeve retainer in accordance with an aspect of this disclosure.

FIG. 1, and the related disclosure, provide an example of one type of irrigation system having the pipeline 14, which may include multiple pipe segments connected end-to-end. Referring now to FIG. 2A, some aspects of a pipeline will be described in more detail, and FIG. 2A depicts a polymer-lined pipe 218, which might construct a portion or segment of the pipeline 14. The polymer-lined pipe 218 includes a pipe 220 (also referred to as a "structural pipe") lined with a polymer sleeve 222 encircling a fluid-transmission channel 223. For example, the polymer sleeve 222 includes an interior surface 225 forming a barrier at least partially around the fluid-transmission channel 223. In addition, the polymer-lined pipe 218 includes a flange 224 that can be used to connect the polymer-lined pipe 218 to another pipe or segment, such as at a pipe junction 19 (in FIG. 1).

The pipe 220 may be formed from a variety of materials such as, by way of example only, galvanized steel, aluminum, or stainless steel. Such material variety provides the ability for users to choose the proper pipeline material based upon the liquid or liquids being dispersed through the irrigation system. As previously described, some liquids dispersed through the pipeline 14 may be highly corrosive to the pipe 220, and as such, the polymer sleeve 222 helps protect the pipe 220 from coming into contact with a corrosive liquid. That is, the polymer sleeve 222 lines the interior surface of the pipe 220 to separate the potentially corrosive liquid from the pipe material. Exemplary materials from which the polymer sleeve 222 may be formed include, without limitation, polyethylene and polypropylene.

As previously set forth, irrigation systems comprising a polymer-lined pipe (e.g., 218) present a unique set of challenges, such as retaining the polymer sleeve 222 in the pipe 220, protecting the polymer sleeve 222, and sealingly connecting the polymer-lined pipe 218 to another pipe, such as in the pipeline 14. As such, an aspect of the present disclosure includes a sleeve retainer 226A that may be inserted into the polymer-lined pipe 218.

The sleeve retainer 226A includes various elements. For example, the sleeve retainer 226A includes a tubular body 228A having a first terminal end 230A and a second terminal end 232A. The tubular body 228A also includes an interior surface 234A and an exterior surface 236A. The first terminal end 230A is configured to be inserted into the fluid-transmission channel 223, and in some aspects, the first terminal end 230A may be referred to as a "pilot end" or "pilot terminal end." In addition, the sleeve retainer 226A also includes a flange 238A protruding radially outward from the second terminal end 232A, and as will be described in more detail in other portions of this disclosure, the flange 238A is configured to nest with, and abut, the flange 224.

The exterior surface 236A of the tubular body 228A includes one or more protuberances that frictionally engage the interior surface 225 of the polymer sleeve 222 when the tubular body 228A is inserted into the fluid-transmission channel 223. A protuberance may include various structures, including nodes, fingers, bumps, projections, ribs, ridges, barbs, sealing rings, and the like. In one aspect of the disclosure, the protuberances include one or more barbs 240A, 240B, and 240C. The barbs 240A-C depicted in FIG. 2A are examples of one aspect of the disclosure, and in other aspects described in other portions of this disclosure, the barbs may have different characteristics, such as barb profile, barb height, barb length, barb spacing, and barb number.

Figure 2B:
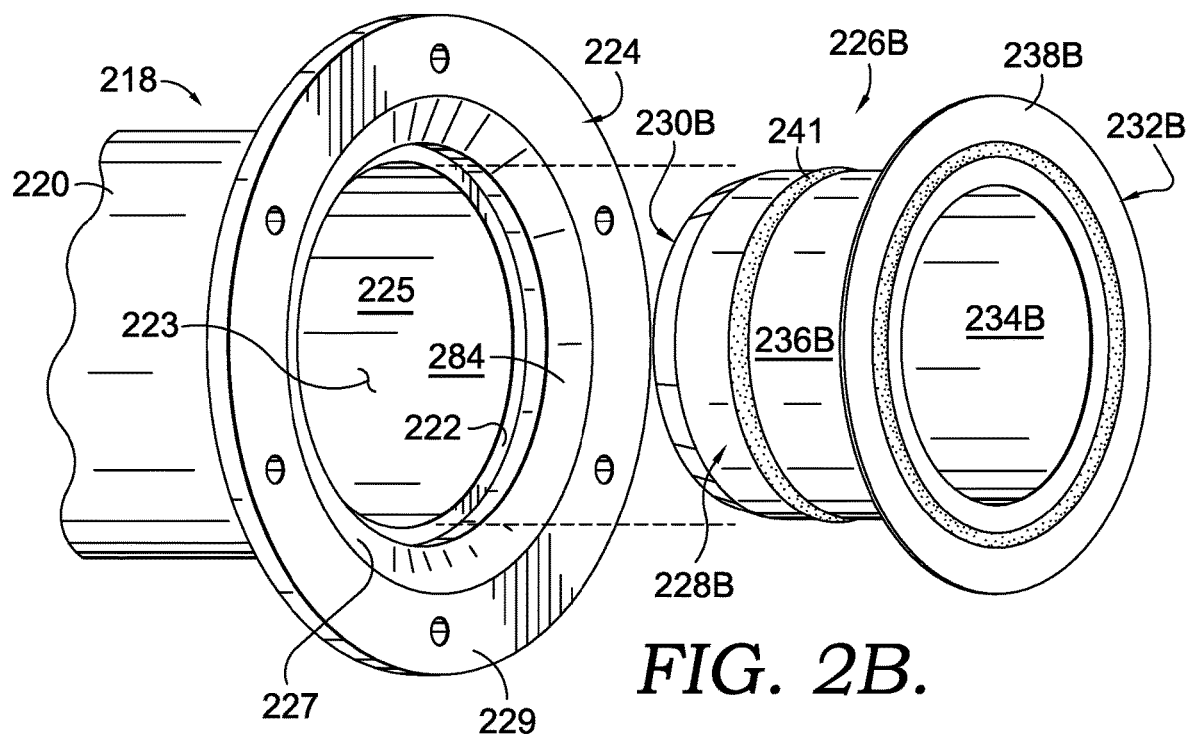
FIG. 2B depicts a polymer-lined pipe and an alternative sleeve retainer in accordance with an aspect of this disclosure.

The sleeve retainer 226A illustrates one type of sleeve retainer in which the one or more protuberances include barbs. In another aspect, as depicted in FIG. 2B, a sleeve retainer 226B might include a different type of protuberance. Similar to the sleeve retainer 226A, the sleeve retainer 226B includes a tubular body 228B having a first terminal end 230B and a second terminal end 232B and having an interior surface 234B and an exterior surface 236B. The first terminal end 230B is configured to be inserted into the fluid-transmission channel 223, and in some aspects, the first terminal end 230B may be referred to as the pilot end or pilot terminal end. In addition, the sleeve retainer 226B also includes a flange 238B protruding radially outward from the second terminal end 232B, and as will be described in more detail in other portions of this disclosure, the flange 238B is configured to nest with, and abut, the flange 224 of the polymer-lined pipe 218. The sleeve retainer 226B also includes a protuberance that protrudes from the exterior surface 236B and that frictionally engages the interior surface 225 of the polymer sleeve 222 when the tubular body 228B is inserted into the fluid-transmission channel 223. As depicted by FIG. 2B, in accordance with one aspect of the disclosure, the protuberance includes an O-ring 241 seated in a groove constructed into the exterior surface 236B. FIG. 2B also depicts a second O-ring 243, which may help form a seal with another sleeve retainer at a pipe junction, as will be described in other parts of this disclosure.

The sleeve retainers 226A and 226B may be constructed of various materials. For example, in one aspect, the sleeve retainers 226A and 226B are constructed of rubber, urethane, plastic, Ultra High Molecular Weight Plastic (UHMWP), Ultra High Molecular Weight (UHMW), High Density Polyethylene (HDPE), or similar material. The sleeve retainers 226A and 226B may be constructed of varying durometers or hardness. In addition, a single sleeve retainer may have multiple varied durometers or hardness within the same device.

Figure 3A:
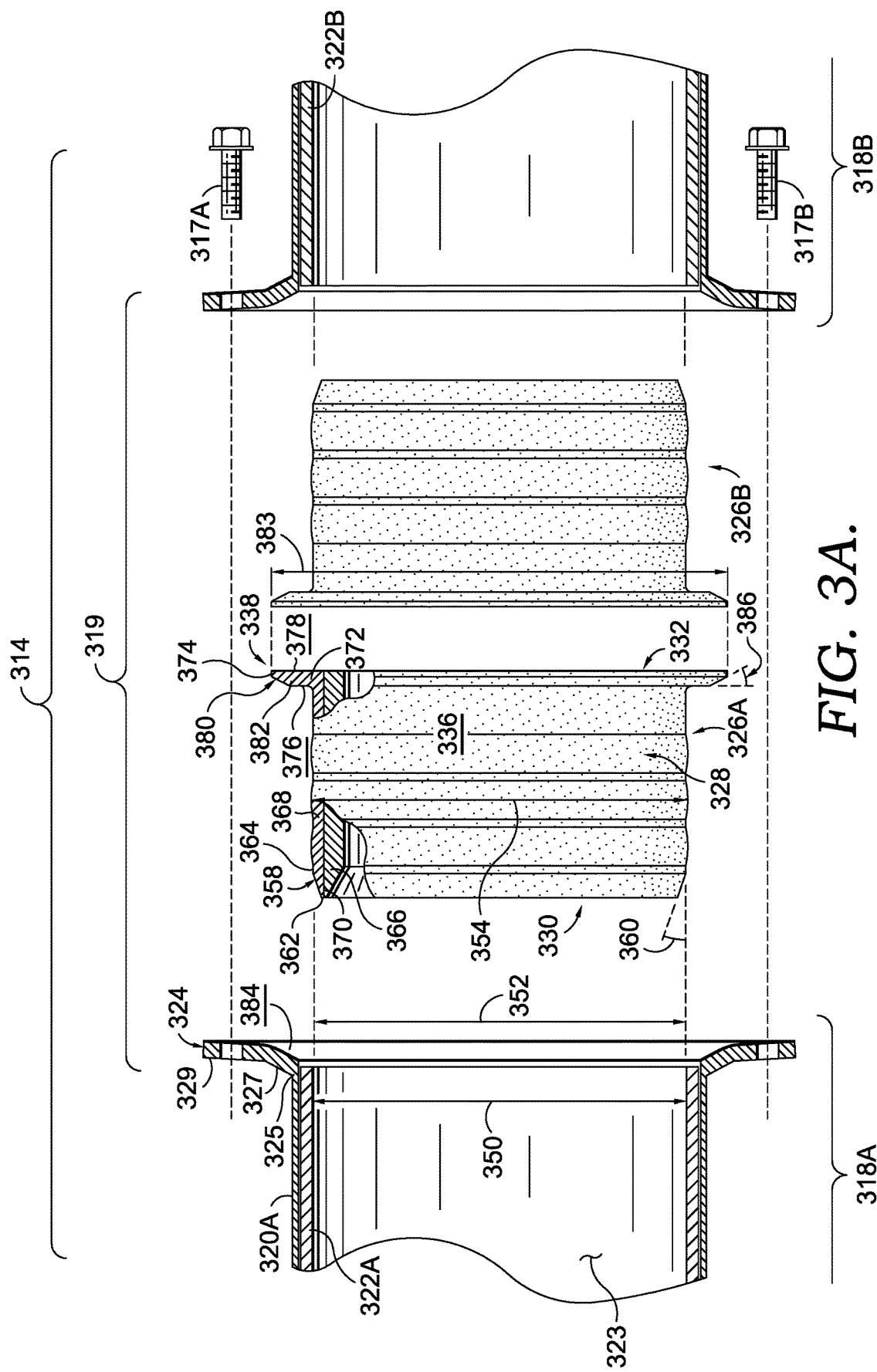
FIG. 3A depicts an exploded view of a pipe junction with a barb-style sleeve retainer in accordance with an aspect of this disclosure.
Figure 3B:
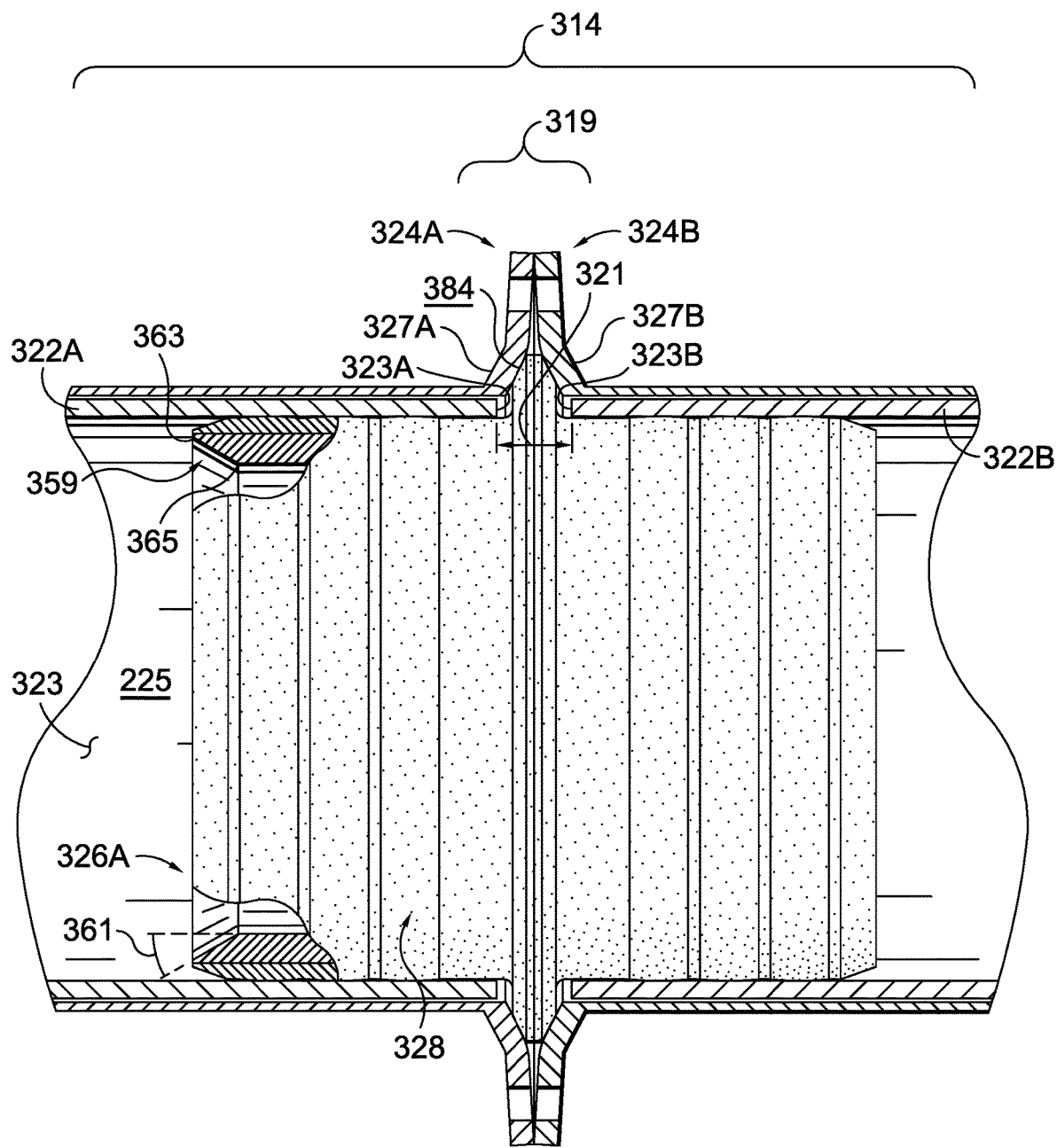
FIG. 3B depicts an assembled view of the pipe junction in FIG. 3A in accordance with an aspect of this disclosure.

Having generally described some different aspects of a sleeve retainer, reference is now made to FIGS. 3A and 3B, which depict a portion of a pipeline 314, having two pipe segments 318A and 318B and two sleeve retainers 326A and 326B. The two pipe segments 318A and 318B are coupled to one another at a pipe junction 319, which is an example of a pipe junction 19 in FIG. 1 connecting two pipe segments end-to-end. FIG. 3A depicts the pipe junction 319 in an exploded view (i.e., disconnected or uncoupled state) to aid with the description, and FIG. 3B depicts the pipe junction 319 in an assembled state. For example, in FIG. 3A, the sleeve retainers 326A and 326B are depicted separated from the polymer-lined pipes 318A and 318B, respectively. In addition, the polymer-lined pipes 318A and 318B, as well as the fasteners 317A and 317B, are illustrated as disconnected from one another. As previously explained, the sleeve retainers 326A and 326B may be inserted into the polymer-lined pipes 318A and 318B, respectively, to help retain polymer sleeves 322A and 322B, to help protect the polymer sleeves 322A and 322B, and to help form a sealed connection at the pipe junction 319, and this assembled state is depicted in FIG. 3B.

Referring to FIG. 3A, the polymer-lined pipe 318A and the sleeve retainer 326A will now be described in more detail, and it is understood that the same description applies equally to the polymer-lined pipe 318B and the sleeve retainer 326B. The polymer-lined pipe 318A includes a structural pipe 320A and the polymer sleeve 322A, which includes a sleeve interior diameter 350. The structural pipe 320A includes a flange 324, which can be used to fasten the polymer-lined pipe 318A to the polymer-lined pipe 318B. The flange 324 includes a flange base 325 coupled to the pipe 320A, such as where the flange 324 is welded or otherwise affixed to the pipe 320A. In addition, the flange 324 includes a conical skirt 327 extending from the flange base 325 and around the terminal end of the structural pipe 320A. Furthermore, the flange 324 includes an annular brim 329 connected to and extending from the conical skirt 327. (In FIG. 2A, examples of a conical skirt 227 and an annular brim 229 are identified for illustrative purposes.)

In an aspect of the present disclosure, when the polymer-lined pipes 318A and 318B are connected end-to-end at the pipe junction 319, the conical skirts 327 create a space between the terminal ends of the polymer sleeves 322A and 322B. For example, referring to FIG. 3B, the flanges 324A and 324B are connected, and the conical skirts 327A and 327B create at least part of a distance 321 spanning a sleeve-transition gap between the terminal ends 323A and 323B of the polymer sleeves 322A and 322B. The flanges 224 and 324 are an example of one type of flange that includes a conical skirt in accordance with one aspect of this disclosure. In other aspects of this disclosure, a polymer-lined pipe might include an alternative flange. For example, in other instances the flange of the polymer-lined pipe might not include a conical skirt, such that the annular brim is coupled (e.g., welded) directly to the structural pipe. In this alternative aspect, these flat flanges are still used to connect pipes end-to-end by connecting the annular brims using a mechanical fastener.

The depictions of polymer-lined pipes 218 and 318A are only examples. For instance, the depicted dimensions of the structural pipe and the polymer sleeves are illustrative in nature and are not meant to convey scale or limit the scope of the disclosure. The walls of the structural pipe and the polymer sleeve might be thicker or thinner than the illustrated versions, and the diameters might be larger or smaller. For example, the sleeve interior diameter 350 might vary, depending on the size of the polymer-lined pipe 318A, and in one aspect, the sleeve interior diameter 350 is in a range of about 3 inches to about 10 inches, which can vary based on the use application, among other things. In addition, the dimensions of the structural-pipe flange might vary, including larger or smaller diameters, thicker or thinner walls, and the like.

Each sleeve retainer 326A and 326B includes various elements that contribute to its operation and functionality. The sleeve retainer 326A will now be described in more detail, and it is understood that the same disclosure applies equally to the sleeve retainer 326B. For illustrative purposes, the sleeve retainer 326A is also depicted separately in FIG. 4.

Figure 4:
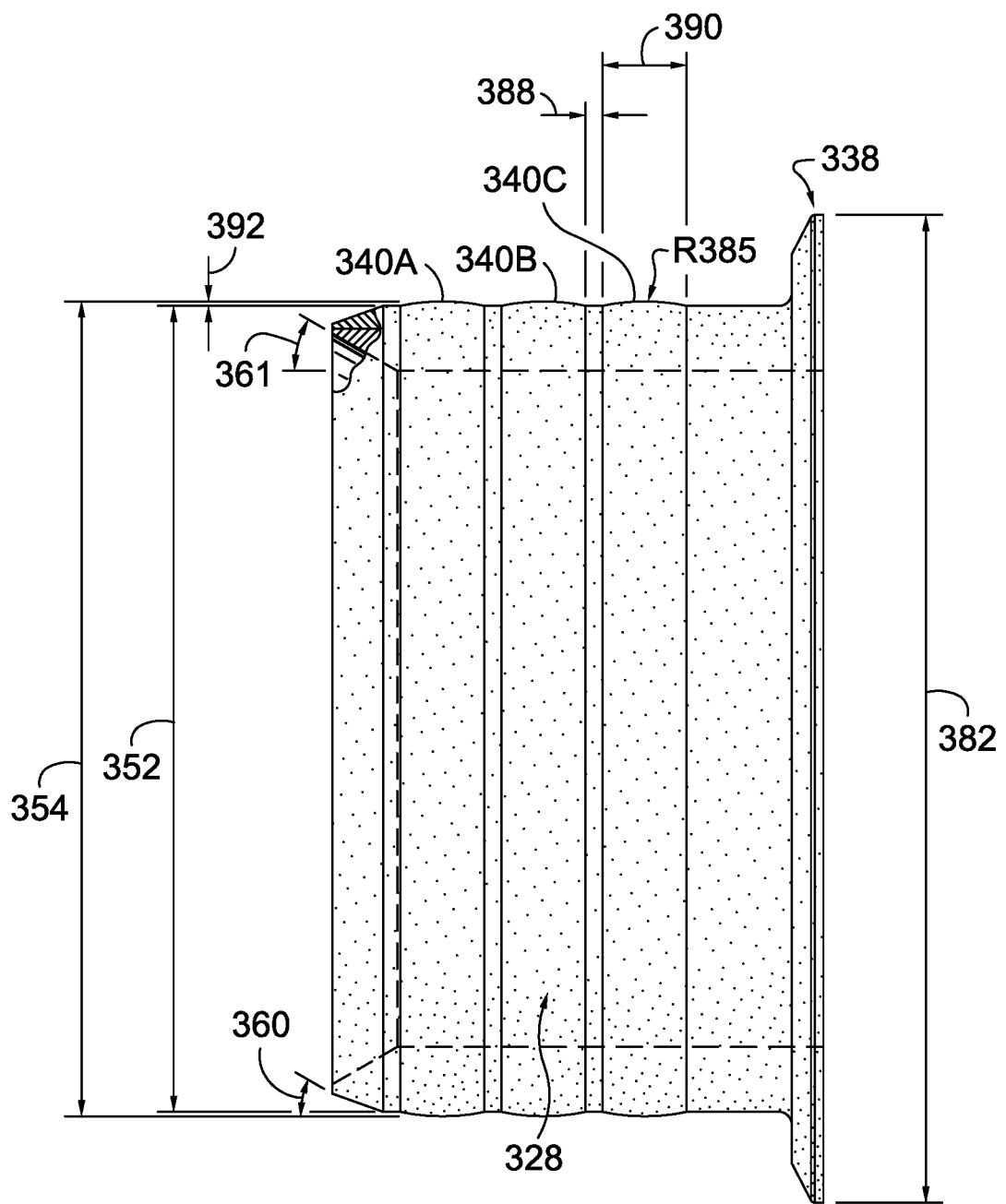
FIG. 4 depicts a side elevation view of a sleeve retainer in accordance with an aspect of this disclosure.

In one aspect, the sleeve retainer 326A includes elements configured to function and operate in conjunction with features of the polymer-lined pipe 318A. For example, referring to FIG. 3A, the tubular body 328 of the sleeve retainer 326A might be configured to be press fit into the fluid-transmission channel 323, and as such, the tubular body 328 might be constructed based on the previously mentioned sleeve interior diameter 350. As depicted in FIGS. 3A and 4, the tubular body 328 includes a tubular-body outer diameter 352, as well as a protuberance outer diameter 354. In one aspect of the disclosure, the tubular-body outer diameter 352 is less than the sleeve interior diameter 350, and the protuberance outer diameter 354 is greater than the sleeve interior diameter 350. As such, tubular body 328 may be inserted into the fluid-transmission channel 323, with the protuberances either plastically or elastically deforming, depending on material type, to frictionally engage within the polymer sleeve 322A.

The respective diameters (e.g., 350, 352, and 354) might vary based on the application of the pipeline and on the style of barb or other protuberance. For example, as indicated above, the sleeve interior diameter 350 might be in a range of about 3 inches to about 10 inches. As such, the dimensions of the sleeve retainer 326A might vary or be customized based on dimensions of the polymer-lined pipe 318A, including the sleeve interior diameter 350 and a polymer-sleeve wall thickness. In one example, the sleeve interior diameter 350 is in a range of about 5.950 inches to about 6.030 inches; the tubular-body outer diameter 352 is in a range of about 5.950 inches to about 5.980 inches; and the protuberance outer diameter 354 is in a range of about 6.020 to about 6.030. These dimensions and tolerances are provided as examples of one aspect of the disclosure, and as mentioned above, the dimensions of the sleeve retainer 326A may vary or be customized based on the dimensions of the structural pipe.

Referring to FIG. 4, the sleeve retainer 326A includes a plurality of protuberances, including a plurality of barbs 340A, 340B, and 340C. The barbs 340A, 340B, and 340C include various elements, including a barb profile, a barb height, a barb length, a barb spacing, and a number of barbs, and as previously described, the dimensions and quantities of these elements may be modified based on the dimensions of the structural pipe. Continuing with the above-described example in which the tubular-body outer diameter 352 is in a range of about 5.950 inches to about 5.980 inches, the barbs 340A, 340B, and 340C each include a rounded profile having a radius R385 in a range of about 1 inch to about 2 inches. In addition, each of the barbs 340A, 340B, and 340C is spaced apart from an adjacent barb by a distance 388 in a range of about 0.100 inches to about 0.150 inches. Furthermore, each barb includes a barb length 390 in a range of about 0.600 to about 0.650. FIG. 4 also identifies a barb height 392 (also referred to as a barb depth), including a distance the barb protrudes outward from the exterior surface, and in one aspect, the barb height 392 is in a range of about 0.030 to about 0.035. Again, these dimensions are intended to be exemplary of one aspect of the disclosure and may be modified in other aspects. FIG. 4 identifies other elements, which will be described in the following paragraphs in more detail in the context of FIGS. 3A and 3B.

Referring back to FIG. 3A, in another aspect of the disclosure, the first terminal end 330 includes an exterior-surface chamfer 358 in the exterior surface 336 and an interior-surface chamfer 359 (see FIG. 3B) in the interior surface 334. The exterior-surface chamfer 358 extends from a terminal-end edge 362 to an exterior-surface edge 364. Among other things, the exterior-surface chamfer 358 may assist with aligning the first terminal end 330 with an opening of polymer sleeve 322A and with guiding the tubular body 328 through the fluid-transmission channel 323 while the sleeve retainer 326A is installed into position. The exterior-surface chamfer 358 may include various angles relative to the exterior surface 336, and in one aspect, the chamfer 358 includes an angle 360 in a range of 15 degrees to 25 degrees.

Referring to FIG. 3B showing the tubular body 328 positioned in the fluid-transmission channel 323, the cut-away view depicts the interior-surface chamfer 359. The interior-surface chamfer 359 extends from a terminal-end edge 363 to an interior-surface edge 365. Among other things, the interior-surface chamfer 359 provides a gradual transition from the interior surface 225 of the polymer sleeve 322A to the interior surface 334 of the sleeve retainer 326A to enhance flow dynamics within the fluid-transmission channel 323. The interior-surface chamfer 359 may include various angles relative to the interior surface 334, and in one aspect, the chamfer 359 includes an angle 361 in a range of 25 degrees to 35 degrees. In another aspect, the angle 360 of the exterior-surface chamfer 358 is less than the angle 361 of the interior-surface chamfer 359.

In a further aspect, the sleeve retainer 326A includes an inner core 366 and an outer core 368. For example, turning briefly to FIG. 2A the sleeve retainer 226A is shown with an inner core 266 and an outer core 268. In FIG. 3A, the inner core 366 and outer core 368 are depicted by respective hatch in the partial cross section (near the first terminal end 330). The inner core 366 and the outer core 368 may have varied thicknesses. For example, in one aspect, the outer core 368 extends along the entire tubular body 328 from the exterior surface 336 (e.g., an outer position aligned with the protuberance outer diameter 356 and the tubular-body outer diameter 352) to a core-transition interface 370. The core-transition interface 370 is a transition from the outer core 368 to the inner core 366, and in one aspect, the core-transition interface 370 intersects the first terminal end 330 at a position that is between the terminal-end edges 362 and 363 of the chamfers 358 and 359. In this sense, the core-transition interface 370 bisects the external and internal chamfers 358 and 359. As such, in a further aspect, the inner core 366 includes a thickness extending from the core-transition interface 370 to the interior surface 334.

The thickness of the outer core 368 and the thickness of the inner core 366 may vary depending on one or more factors, such as the application of the pipeline 314, the fluid to be transmitted through the pipeline, the material from which the sleeve retainer 326 is made, and the style of protuberance. In one aspect of the disclosure, the thickness of the inner core 366 along the portion of the tubular body 328 having the protuberances is larger than the thickness of the outer core 368 along that same region.

As previously described, the sleeve retainer 326A may be constructed of various materials, including rubber, urethane, plastic, Ultra High Molecular Weight Plastic (UHMWP), Ultra High Molecular Weight (UHMW), High Density Polyethylene (HDPE), or similar material. In accordance with one aspect of the disclosure, the inner core includes a first durometer and hardness and the outer core includes a second durometer and hardness, which is different from the first. For example, the first durometer and hardness of the inner core may be higher than the second durometer and hardness of the outer core. These relative material properties may contribute to the operation and functionality of the sleeve retainer 326A in various manners. For example, the softer material of the outer core 368, combined with the more rigid support and backing of the inner core 366, may help facilitate protuberance deformation and frictional engagement and fit when the sleeve retainer 326 is inserted into the polymer sleeve 322A. In addition, the harder material properties of the inner core 366, and the inner surface 334, may improve durability of the sleeve retainer 326A, when liquids are pumped through the pipe junction 319A under pressure, and thereby contact the inner core 366.

The inner core 366 and the outer core 368 might be constructed from the same material having different durometers or from different materials having different durometers. For example, when manufacturing the sleeve retainer 326A, in one aspect the inner sleeve 366 might be cast first using a first material and then used as a core for casting the outer core 368 of a second material (e.g., the same material with a different durometer or a different material with a different durometer). In other aspects, a single-cast approach might be used.

Continuing with FIG. 3A, the sleeve retainer 326A includes a flange 338 extending radially outward from the second terminal end 332. The flange 338 includes a flange base 372 connected to the tubular body 328 and a flange distal edge 374 spaced radially outward from the flange base 372. The flange 338 also includes a first surface 376 that transitions to the exterior surface 336 of the tubular body at the flange base 372 and a second surface 378 that transitions to the interior surface 334 of the tubular body 328 at the flange base 372. In accordance with an aspect of this disclosure, the flange 338 includes a chamfer 380 in the first surface 376 that transitions from a first position 382, which is between the flange distal edge 374 and the flange base 372, to the distal edge 374 of the flange 338.

The flange 338 contributes to the operation of the sleeve retainer 326A in various manners. For example, as depicted in FIG. 3B, the flange 338 protrudes into the sleeve-transition gap, and in this sense, the flange 338 includes a diameter 383 that is larger than the sleeve interior diameter 350. Once the flange 338 is protruding into the sleeve-transition gap, the flange 338 might potentially engage with the sleeve terminal end 323A and with the flange 324A (e.g., to impede the sleeve from sliding out of position). In one aspect of the disclosure, the chamfer 380 of the flange 338 generally compliments with an interior surface 384 of the conical skirt 327A (for reference, see also FIG. 3A identifying the interior surface 384 and FIG. 2A identifying the interior surface 284). That is, the chamfer 380 includes an angle 386 (FIG. 3A) relative to the first surface 376, and the angle 386 may be tailored to allow the chamfer 380 to abut flushly against the interior surface 384 of the conical skirt 327A. For example, in one aspect the angle 386 is in a range of about 25 degrees to about 30 degrees.

As such, the chamfer 380 may contribute to a tighter seal and connection between the sleeve retainer 326A and the pipe 318A. Furthermore, the flange 338 operates as a positive stop against the terminal end 323A to impede the polymer sleeve 322A from sliding out of position. Moreover, the flange 338 includes the second surface 378 that is larger than the terminal end 323A of the polymer sleeve 322A, and as such, provides a larger mating surface (i.e., as compared with to the mating surface provided by only the sleeve terminal ends 323A and 323B) for sealingly compressing against the second surface of the mating sleeve retainer 326B, thereby forming a tighter seal between the polymer-lined pipes 318A and 318B.

The flange 338 operates in other ways, as well. For example, the size of the flange diameter 383 is relative to the diameter 352 of the tubular body 328, and in one aspect of the disclosure, the diameter 383 of the flange 338 is larger than in a typical insert. As such, this larger-style flange (relative to the diameter 352 of the tubular body 328) provides a positive structure to be clamped between the flanges 324A and 324B of the pipes 318A and 318B when the pipes are connected end-to-end, such as by using connectors 317A and 317B. For example, in one aspect of the disclosure, the sleeve retainer 326 includes a flange diameter 383 that is about 25% larger than the tubular-body outer diameter 352, which provides a large enough flange to be clamped between the flanges 324A and 324B.

In a further aspect of the disclosure, the structural configuration of the flanges 338A/B and the flanges 324A/B collectively form a sealed pipe junction 319, in which the flange distal edges (i.e., 374) are enclosed and substantially blocked from outside elements, such as UV rays, debris, and other potentially damaging environment elements. This aspect is depicted in FIG. 3B in which the distal edges 374 are enclosed by the annular brims, and the structural elements contributing to the enclosure include the size of the sleeve-transition gap 321 and the corresponding combined thickness of the flanges 338A/B, as well as the surface angles of the conical-skirt interior surface 384, the chamfer angle 386, and the diameter 383.

As described in other portions of this disclosure, the structural-pipe flange may omit the conical skirt, such that the annular brim is coupled directly to the structural pipe, and the sleeve retainers 326A and 326B are also operable with this style of flat flange. In that instance, the flanges 338A/B would still be clamped between the annular brims of the flat flanges, provide a seal between the polymer-lined pipes, and help retain the polymer sleeves in place. In addition, in the event that the junction is exposed to potentially-damaging elements (e.g., UV, debris, chemicals, etc.), the outermost portions of the flanges 338A/B, such as the terminal end 374, help protect the more interior portions of the sleeve retainer, such as the interior surface 234A.

Various aspects of the sleeve retainer 326A have been described with respect to FIGS. 3A, 3B, and 4. In other aspects, one or more elements of the sleeve retainer 326A and 326B may be modified consistent with alternative sleeve retainers, and these alternative sleeve retainers still operate in a similar manner to retain the polymer sleeve in position, to protect the polymer sleeve, and to form a seal with another pipe connected end-to-end. For example, referring to FIGS. 5A, 5B, and 5C, the barbs have been modified to include different elements, and in FIGS. 6A and 6B, the protuberance includes an O-ring. The sleeve retainers in FIGS. 5A, 5B, 5C, 6A, and 6B that are modified are similar in various respects to the sleeve retainer 326A. For example, in one aspect the sleeve retainer in each of FIGS. 5A, 5B, 5C, 6A, and 6B includes a tubular body, a first terminal end, and a second terminal end. The first terminal end includes an exterior surface chamfer and an interior surface chamfer, and the second terminal end includes a flange with a chamfer. These common features operate in a manner similar to that described with respect to the sleeve retainer 326A.

Having described some of the general similarities between the sleeve retainer 326A and the sleeve retainers in FIGS. 5A, 5B, 5C, 6A, and 6B, now some of the other features will be described in more detail. Turning to FIG. 5A, a portion of a sleeve retainer 526A is depicted. The sleeve retainer 526A includes a dual-core tubular body 528A, a first terminal end 530A with outer and inner chamfers 558 and 559, and a second terminal end 532 with a flange 538 having a chamfer 580. In contrast to the sleeve retainer 326A, the sleeve retainer 526A includes different barbs 540A, 540B, and 540C, including a curved barb profile having a radius R585, which is smaller than the radius R385. For example, the radius R585 might be in a range of about 0.25 inches to about 0.5 inches. In addition, the barbs 540A-C, include a barb spacing 588, which is similar or equivalent to the barb spacing 388 of the sleeve retainer 326A, and a barb length 590, which is smaller than the barb length 390 of the sleeve retainer 326A. For example, in one aspect, the barb length 590 is in a range of about 0.250 inches to about 0.350 inches. These dimensions are intended to be exemplary of one aspect of the disclosure and may be modified in other aspects based on various factors, such as the dimensions of the polymer-lined pipe.

Referring now to FIG. 5B a portion of another sleeve retainer 526B is depicted, and in one aspect, the portions of the sleeve retainer 526B not depicted or expressly described are similar to the sleeve retainer 326A (e.g., second terminal end with flange). In contrast with the sleeve retainer 326A, the sleeve retainer 526B includes different barbs 540D, 540E, and 540F, including a flat barb profile with angled sides. For example, each barb 540D-F includes a leading flat, angled surface 545A that transitions to a flat, sleeve-engaging surface 545B, which then transitions to a trailing flat, angled surface 545C. The barbs 540D-E are positioned directly adjacent to one another, such that the trailing flat, angled surface of one barb abuts, and forms an angle 589A with the leading flat, angled surface of an adjacent barb. In one aspect, the angle 589A is about 90 degrees and each flat, angled surface extends from the tubular body at a 45 degree angle. As such, the flat, sleeve-engaging surfaces are all spaced apart by annular, V-shaped grooves. In one aspect of the disclosure, a V-shape groove spans a distance 588B in a range of about 0.060 inches to about 0.070 inches, and the flat, sleeve-engaging surfaces have a width 591 in a range of about 0.150 inches to about 0.200 inches. In a further aspect, each barb includes a trough-to-trough barb length 590B of about 0.250 inches. These dimensions are intended to be exemplary of one aspect of the disclosure and may be modified in other aspects based on various factors, such as the dimensions of the polymer-lined pipe.

Turning to FIG. 5C, another portion of a sleeve retainer 526C is depicted, and similar to FIG. 5B, in one aspect, the portions of the sleeve retainer 526B not depicted or expressly described are similar to the sleeve retainer 326A. In contrast with the sleeve retainer 326A, the sleeve retainer 526C includes different barbs 540G, 540H, and 540I, including a more angular barb profile with a slightly rounded peak, combined with a notched or groove spacing, similar to the sleeve retainer 526B. In addition, the barb length is different. For example, the barbs 540G, 540H, and 540I each include a leading flat, angled surface 545D and a trailing flat, angled surface 545E, and each flat, angled surface is joined by a rounded peak 545F. Similar to the version described in FIG. 5B, each flat, angled surface extends from the tubular body at a 45 degree angle 589B, such that the V-shaped groove angle is about 90 degrees. In addition, each barb includes a trough-to-trough barb length 590C in a range of about 0.060 inches to about 0.070 inches, and each peak 545F includes a radius of about 0.015 inches. In a further aspect, the barbs form a barb cluster 540J having a barb-cluster width 595 in a range of about 0.375 inches to about 0.425 inches. These dimensions are intended to be exemplary of one aspect of the disclosure and may be modified in other aspects based on various factors, such as the dimensions of the polymer-lined pipe.

A variety of different sleeve retainers with different barb styles have been described with respect to FIGS. 3A-B, 4, and 5A-C. The barb style might be selected based on various considerations, such as ease of press-fit installation, sealing ability, and sleeve-retention capacity once installed.

Other aspects of this disclosure include other alternative sleeve retainers. For example, turning to FIGS. 6A and 6B, a sleeve retainer 626A includes some elements that are similar to, and some elements that are different from, the sleeve retainer 326A, and although only the sleeve retainer 626A is expressly described, it is understood that the sleeve retainer 626B may include the same elements. The sleeve retainer 626A may be similar to the sleeve retainer 326A in various respects, which operate and function in a manner similar to that described in other portions of this disclosure, even if these similarities are not expressly described (in order to avoid over-redundancy in this disclosure). For example, the sleeve retainer 626A includes a tubular body 628, a first terminal end 630 with outer and inner chamfer 658 and 659, and a second terminal end 632 with a flange 638 having a chamfer 680 and a flange diameter. In addition, the tubular body 628 may include a tubular-body outer diameter 652 that is less than the sleeve inner diameter 650. In one aspect of the disclosure, the sleeve retainer 626A includes a different type of protuberance that seals against an interior surface 625 of the polymer sleeve 622. More specifically, the sleeve retainer 626A includes an O-ring 441 seated in an exterior surface groove 643 formed in the exterior surface 636 of the tubular body 628. Furthermore, in one aspect, the outer diameter of the O-ring 641 in an uncompressed state is larger than the sleeve inner diameter 650.

In another aspect, since the sleeve retainer 626A relies on compression of the O-ring 641 to seal against the interior surface 625 (e.g., FIG. 6B), the tubular body 628 might include a single-core body, as opposed to the dual core described with respect to FIGS. 3A and 3B. That is, in FIGS. 3A and 3B, the outer core 368 constructed of a softer material deforms or compresses to seal against the interior surface 325, and since the sleeve retainer 626A relies on O-ring compression, then a softer outer core may not be necessary.

In a further aspect, the sleeve retainer 626A includes an annular O-ring retention groove 679 formed in the second surface 678 of the flange 638. As such, referring to FIG. 6B, an O-ring 681 can be retained between the sleeve retainers 626A and 626B when the flanges 638A and 638B are positioned in the sleeve-transition gap and compressed between the flanges 624A and 624B.

Referring now to FIG. 7, another sleeve retainer 726 in accordance with another aspect of the disclosure. The sleeve retainer 726 is similar to the sleeve retainers 326A and 626A in various respects, which operate and function in a similar manner. For example, the sleeve retainer 726 includes a tubular body 728, a first terminal end 730 with outer chamfer 758 and inner chamfer (hidden from view as illustrated by dashed line), and a second terminal end 732 with a flange 738 having a chamfer 780 and a flange diameter. In addition, the tubular body 728 may include a tubular-body outer diameter 752 that is less than a sleeve inner diameter (not shown in FIG. 7 and sleeve inner diameter 350 is exemplary). In contrast with the sleeve retainer 626A, in one aspect of the disclosure, the sleeve retainer 726 includes a plurality of O-ring style protuberances 741A and 741B, each seated in a respective groove.

Various sleeve retainers have been described with respect to FIGS. 3A-3B, 4, 5A-5C, 6A-6B, and 7, and each of these sleeve retainers includes a single-insert, sleeve retainer. As previously described, the second terminal end (e.g., 332A and 632) of a single-insert, sleeve retainer abuts against, and forms a seal with the second terminal end of an opposing single-insert sleeve retainer when installed in a pipe junction (see e.g., FIGS. 3B and 6B). However, in other aspects of this disclosure, a sleeve retainer might include a dual-insert construction, in which a single sleeve retainer with two pilot terminal ends forms a union between two polymer-sleeve pipes at a pipe junction.

Referring now to FIGS. 8A, 8B, 9A, and 9B, various dual-insert, sleeve retainers are depicted, and will now be described. FIG. 8A illustrates a sleeve retainer 826A having a tubular body 828A with a first pilot terminal end 830A and a second pilot terminal end 830B. Between the first pilot terminal end 830A and the second pilot terminal end 830B, the sleeve retainer 826A includes a flange 838A. In addition, the tubular body 828A includes a first set of one or more protuberances between the flange 838A and the first terminal end 830A, and the tubular body 828A includes a second set of one or more protuberances between the flange 838A and the second pilot terminal end 830B. The sleeve retainer 826B of FIG. 8B includes similar elements, including a tubular body 828B with a first pilot terminal end 830C and a second pilot terminal end 830D, a flange 838B, and a first and second set of protuberances between the flange 838B and a respective pilot terminal end.

In a further aspect of the disclosure, the sleeve retainers 826A and 826B include various features that are similar to those described with respect to the sleeve retainer 326A, with the exception being that the dual-insert version is formed as a single, continuous body. For example, the pilot terminal ends of the sleeve retainers 826A and 826B each include outer and inner chamfers 858 and 859 (see cut away in FIG. 8B), similar to the chamfers 358 and 359. In addition, the tubular-body outer diameter 852 (FIG. 8A) is less than a sleeve interior diameter (see for example 350 in FIG. 3A), and the protuberance outer diameter 854 (FIG. 8A) is greater than the sleeve interior diameter. Furthermore, the sleeve retainers 826A and 826B may include a dual-core construction with an outer core having a lower durometer and hardness. As such, the tubular body 828A and 828B of the sleeve retainers 826A and 826B press fits into, and seals against the interior surface of, a polymer sleeve.

The flanges 838A and 838B are also similar in various respects to the flanges 338A and 338B. The flanges 838A and 838B protrude radially outward from the exterior surface of the tubular body 828A and 828B at a position between the first and second terminal ends. The flanges 838A and 838B include a flange base connected to the tubular body and a flange distal edge 874A and 874B spaced radially outward from the flange base. The flanges include a first surface 876A, a second surface 876B, and a thickness 877 between the first and second surface. The first surface and the second surface each transition from the exterior surface of the tubular body to the flange distal edge 874A or 874B on opposing sides of the flange. A first chamfer 880A or 880C in the first surface transitions to the flange distal edge, and a second chamfer 880B or 880D in the second surface that transitions to the flange distal edge. Stated in another way, the flanges 838A and 838B each includes chamfers 880A/B and 880C/D on opposing sides of the flange, and the chamfers are configured to abut flushly with the interior surfaces (e.g., 384) of the conical skirts (e.g., 327A/B). Furthermore, the flanges 838A and 838B each includes a diameter 883 (e.g., FIG. 8A) that, when positioned in a pipe junction, allows the flange 838A/B to protrude into the sleeve-transition gap, engage with the sleeve terminal ends, and be compressively captured or clamped between pipe flanges. As described in other portions of this disclosure, when installed at a pipe junction, the flanges 838A/B may be enclosed and substantially blocked from outside elements, such as UV rays, debris, and other potentially damaging environment elements.

In accordance with one aspect of this disclosure, the protuberances may vary between the flange 838A/B and the pilot terminal ends. For example, in FIG. 8A, the first set of one or more protuberances includes the barbs 840A, 840B, and 840C, and the second set of one or more protuberances includes the barbs 840D and 840E. As such, in accordance with one aspect of the disclosure, the first and second sets of one or more protuberances includes barbs having a different barb profile from one another, any of which might be selected from the profiles illustrated by FIGS. 4 and 5A-5C. For example, the barbs 840D and 840E are longer with larger radii and with wider spacing therebetween, as compared with the barbs 840A, 840B, and 840C. However, as depicted in FIG. 8B, in another aspect of this disclosure, the sleeve retainer 826B might include barbs with a same barb profile on both sides of the dual-insert, sleeve retainer 826B. That is, the barbs 840F-H include the same barb profile as the barbs 840I-K. Again, the barb profiles that are the same on both ends might include any of those profiles depicted in, and described with respect to, FIGS. 4 and 5A-5C.

The sleeve retainers 826A and 826B operate and function in a manner similar to that described with respect to FIGS.

3A-3B, 4, and 5A-5C, such as by retaining the polymer sleeve in position, protecting the polymer sleeve, and to forming a sealed connection at the pipe junction joining polymer-lined pipes end-to-end.

Referring now to FIGS. 9A and 9B, other dual-insert sleeve retainers 926A and 926B are illustrated in accordance with an aspect of this disclosure. The sleeve retainers 926A and 926B are similar to the sleeve retainers 826A and 826B, except the sleeve retainers 926A and 926B include O-ring protuberances, as opposed to barbs, for frictionally engaging a polymer sleeve (e.g., 322A and 322B). For example, the sleeve retainer 926A includes a single O-ring 941A on a first side of the dual-insert sleeve retainer 926A and a single O-ring 941B on a second side of the dual-insert sleeve retainer 926B. In another aspect, the dual-insert sleeve retainer 926B includes a first and second O-ring 941C and 941D on a first side of the dual-insert sleeve retainer 926B and a first a second O-ring 941E and 941F on a second side of the dual-insert sleeve retainer 926B. The dual-insert sleeve retainers 926A and 926B might include only a single core with a single durometer, since the dual-insert sleeve retainers 926A and 926B utilize O-ring compression to achieve a friction fit, as opposed to outer-core compression. But in other respects, the dual-insert sleeve retainers 926A and 926B might operate and function very similarly in order to retain the polymer sleeve in position, protect the polymer sleeve, and form a sealed connection at a pipe junction joining polymer-lined pipes end-to-end.

Some aspects of this disclosure have been described with respect to the examples provided by FIGS. 1-9B. Additional aspects of the disclosure will now be described that may be related subject matter included in one or more claims of this application, or one or more related applications, but the claims are not limited to only the subject matter described in the below portions of this description. These additional aspects may include features illustrated by FIGS. 1-9B, features not illustrated by FIGS. 1-9B, and any combination thereof. When describing these additional aspects, reference may be made to elements depicted by FIGS. 1-9B for illustrative purposes.

As such, one aspect of the present disclosure includes fluid-transmission line (e.g., pipeline 14) including a first pipe and a second pipe (e.g., pipes 318A and 318B). The first pipe (e.g., 318A) includes a first polymer sleeve (e.g., 322A) lining an interior of the first pipe. The first polymer sleeve encloses a first fluid-transmission channel (e.g., 323) and includes a first sleeve terminal end (e.g., 323A) and a first sleeve interior diameter (e.g., 350). The second pipe (e.g., 318B) is connected to the first and includes a second polymer sleeve (e.g., 322B) lining an interior of the second pipe. The second polymer sleeve encloses a second fluid-transmission channel and comprises a second sleeve terminal end (e.g., 323B) and a second interior diameter. The first sleeve terminal end and the second sleeve terminal end face towards one another and are spaced apart by a sleeve-transition gap (e.g., distance 321). The fluid-transmission line also includes a sleeve retainer (e.g., 226A; 226B; combination of 326A and 326B; 526A, 526B, 526C; combination of 626A and 626B; 726; 826A; 826B; 926A; or 926B) including a first tubular body positioned in the first fluid-transmission channel at the first sleeve terminal end of the first polymer sleeve, and a second tubular body positioned in the second fluid-transmission channel at the second sleeve terminal end of the second polymer sleeve. The sleeve retainer also includes one or more portions (e.g., 338; 538; 638; 738; 838A; 838B) protruding into the sleeve-transition gap and having a third diameter that is greater than the first and second interior diameters. As such, in accordance with this aspect, a connection at a pipe junction (e.g., 19) might include a combination of two single-insert sleeve retainers or one double-insert sleeve retainer.

Another aspect of the disclosure includes a sleeve retainer for a polymer-lined pipe. The sleeve retainer includes a tubular body with a first terminal end and a second terminal end and an interior surface and an exterior surface (e.g., single-insert sleeve retainers, such as 226A, 226B, 326A, 526A-C, 626A, or 726). The first terminal end of the tubular body is configured to be inserted into the polymer-lined pipe. A flange protrudes radially outward from the second terminal end. The flange includes a flange base connected to the tubular body and a flange distal edge spaced radially outward from the flange base. A flange also includes a first surface that transitions to the exterior surface of the tubular body at the flange base and a second surface that transitions to the interior surface of the tubular body at the flange base. The flange further includes a chamfer in the first surface that transitions from a first position between the flange distal edge and the flange base to the distal edge of the flange.

A further aspect of the disclosure includes a sleeve retainer (e.g., dual-insert sleeve retainer) for a polymer-lined pipe, and the sleeve retainer includes a tubular body having a first terminal end and a second terminal end and an interior surface and an exterior surface. The first terminal end of the tubular body is configured to be inserted into a first polymer-lined pipe and the second terminal end of the tubular body is configured to be inserted into a second polymer-line pipe. The sleeve retainer also includes a flange protruding radially outward from the exterior surface at a position between the first and second terminal ends. The flange includes a flange base connected to the tubular body and a flange distal edge spaced radially outward from the flange base. The flange includes a first surface, a second surface, and a thickness between the first and second surface. The first surface and the second surface each transition from the exterior surface of the tubular body to the flange distal edge on opposing sides of the flange. A first chamfer in the first surface transitions to the flange distal edge, and a second chamfer in the second surface that transitions to the flange distal edge.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A sleeve retainer for a polymer-lined pipe, the sleeve retainer comprising:
   a tubular body comprising a first terminal end and a second terminal end and comprising an interior surface and an exterior surface, wherein the exterior surface includes one or more protuberances thereon;
   the first terminal end of the tubular body configured to be inserted into the polymer-lined pipe; and
   a flange protruding radially outward from the second terminal end, the flange comprising:
   a flange base connected to the tubular body;
   a flange distal edge spaced radially outward from the flange base; and
   a first surface that transitions to the exterior surface of the tubular body at the flange base and a second surface that transitions to the interior surface of the tubular body at the flange base;
wherein the first surface includes a chamfer that transitions from a first position between the flange distal edge and the flange base to the flange distal edge of the flange, wherein the tubular body comprises an inner core and an outer core, and wherein the inner core includes a higher durometer than the outer core.

2. The sleeve retainer of claim 1, wherein the interior surface of the sleeve retainer forms a sleeve interior diameter, and wherein the exterior surface of the sleeve retainer forms a sleeve exterior diameter.

3. The sleeve retainer of claim 2, wherein the sleeve interior diameter is in a range of 3 inches to 10 inches.

4. The sleeve retainer of claim 1, wherein the exterior surface of the tubular body includes an external chamfer at the first terminal end and the interior surface includes an internal chamfer at the first terminal end.

5. The sleeve retainer of claim 1, wherein the chamfer includes an angle in a range of about 25 degrees to about 30 degrees, relative to the first surface.

6. The sleeve retainer of claim 1,
wherein the exterior surface of the tubular body includes an external chamfer at the first terminal end and the interior surface includes an internal chamfer at the first terminal end;
wherein the tubular body comprises an inner core and an outer core, the inner core having a higher durometer than the outer core; and
wherein the inner core includes an inner-core thickness extending from the interior surface to a core-transition interface that bisects the external chamfer and the internal chamfer.

7. The sleeve retainer of claim 1, wherein the one or more protuberances are located between the flange and the first terminal end.

8. The sleeve retainer of claim 7, wherein the one or more protuberances are barbs.

9. The sleeve retainer of claim 7, wherein the one or more protuberances further include an O-ring seated in a groove.

10. A sleeve retainer for a polymer-lined pipe, the sleeve retainer comprising:
a tubular body comprising a first terminal end and a second terminal end and comprising an interior surface and an exterior surface, wherein the exterior surface includes one or more protuberances thereon;
the first terminal end of the tubular body configured to be inserted into a first polymer-lined pipe and the second terminal end of the tubular body configured to be inserted into a second polymer-line pipe; and
a flange protruding radially outward from the exterior surface at a position between the first terminal end and the second terminal end, the flange comprising:
a flange base connected to the tubular body;
a flange distal edge spaced radially outward from the flange base; and
a first surface, a second surface, and a thickness between the first surface and the second surface;
the first surface and the second surface each transitioning from the exterior surface of the tubular body to the flange distal edge on opposing sides of the flange;
wherein the first surface includes a first chamfer that transitions to the flange distal edge; and
wherein the second surface includes a second chamfer that transitions to the flange distal edge, wherein the tubular body comprises an inner core and an outer core, and wherein the inner core includes a higher durometer than the outer core.

11. The sleeve retainer of claim 10, wherein the interior surface of the sleeve retainer forms a sleeve interior diameter, and wherein the exterior surface of the sleeve retainer forms a sleeve exterior diameter.

12. The sleeve retainer of claim 11, wherein the sleeve interior diameter is in a range of 3 inches to 10 inches.

13. The sleeve retainer of claim 10, wherein the exterior surface of the tubular body includes external chamfers at the first terminal end and the second terminal end, and the interior surface includes internal chamfers at the first terminal end and the second terminal end.

14. The sleeve retainer of claim 10, wherein the first chamfer includes an angle in a range of about 25 degrees to about 30 degrees, relative to the first surface; and wherein the second chamfer includes an angle in a range of about 25 degrees to about 30 degrees, relative to the second surface.

15. The sleeve retainer of claim 10,
wherein the exterior surface of the tubular body includes an external chamfer at the first terminal end and the interior surface includes an internal chamfer at the first terminal end;
wherein the tubular body comprises an inner core and an outer core, the inner core having a higher durometer than the outer core; and
wherein the inner core includes an inner-core thickness extending from the interior surface to a core-transition interface that bisects the first chamfer and the second chamfer.

16. The sleeve retainer of claim 10, wherein the one or more protuberances are located between the flange and the first terminal end.

17. The sleeve retainer of claim 16, wherein the one or more protuberances are barbs.

18. The sleeve retainer of claim 16, wherein the one or more protuberances further include an O-ring seated in a groove.

* * * * *